(12) United States Patent
Brandt et al.

(10) Patent No.: US 11,171,918 B2
(45) Date of Patent: Nov. 9, 2021

(54) GENERATING LOCATION-BASED ADDRESSES FOR WIRELESS NETWORK COMMUNICATION

(71) Applicant: Rockwell Automation Technologies, Inc., Mayfield Heights, OH (US)

(72) Inventors: David D. Brandt, New Berlin, WI (US); Patrick K. Duffy, Milwaukee, WI (US); Jerry Michael Watkins, Franklin, WI (US); William H. Martin, Franklin, WI (US); Dayin Xu, Shanghai (CN); Guolin Zhang, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/430,158

(22) Filed: Jun. 3, 2019

(65) Prior Publication Data
US 2020/0382468 A1 Dec. 3, 2020

(51) Int. Cl.
| | |
|---|---|
| *H04L 29/12* | (2006.01) |
| *H04W 76/11* | (2018.01) |
| *H04L 12/751* | (2013.01) |
| *H04L 12/741* | (2013.01) |
| *H04W 8/26* | (2009.01) |
| *H04W 40/24* | (2009.01) |
| *H04W 64/00* | (2009.01) |

(52) U.S. Cl.
CPC .......... *H04L 61/6004* (2013.01); *H04L 45/02* (2013.01); *H04L 45/54* (2013.01); *H04L 61/609* (2013.01); *H04L 61/6081* (2013.01); *H04W 8/26* (2013.01); *H04W 40/246* (2013.01); *H04W 64/003* (2013.01); *H04W 76/11* (2018.02)

(58) Field of Classification Search
CPC . H04L 61/6004; H04L 61/6081; H04L 45/02; H04L 45/54; H04L 63/105; H04L 9/30; H04L 29/12009; H04L 61/609; H04W 76/11; H04W 8/26; H04W 64/003; H04W 12/12; G05B 15/02; G05B 19/4186; G06F 21/335; G01S 5/0027
See application file for complete search history.

(56) References Cited

U.S. PATENT DOCUMENTS

| | | | | |
|---|---|---|---|---|
| 6,101,499 A | * | 8/2000 | Ford | ................. H04L 29/12216 |
| 7,382,271 B2 | * | 6/2008 | McFarland | ............ G05B 15/02 |
| | | | | 340/686.6 |

(Continued)

FOREIGN PATENT DOCUMENTS

WO 2018049406 A1 3/2018

OTHER PUBLICATIONS

Misra, et al., A PKI Adapted Model for Secure Information Dissemination in Industrial Control and Automation 6LoWPANs, May 13, 2015 (Year: 2015) (Year: 2015).*

(Continued)

*Primary Examiner* — Nam T Tran
(74) *Attorney, Agent, or Firm* — Fletcher Yoder, P.C.

(57) ABSTRACT

A system may include a first device that has a first network component and a second device that has a second network component. The second network component may receive a data packet from the first network component based at least in part on a network address, where the network address is generated based at least in part on a location of the first device.

19 Claims, 8 Drawing Sheets

(56) References Cited

U.S. PATENT DOCUMENTS

| | | | |
|---|---|---|---|
| 7,606,890 B1 | 10/2009 | Baier et al. | |
| 7,716,489 B1* | 5/2010 | Brandt | G06F 21/335 |
| | | | 713/180 |
| 7,929,535 B2* | 4/2011 | Chen | H04L 61/6004 |
| | | | 370/392 |
| 7,974,311 B2* | 7/2011 | Vesterinen | H04L 29/12801 |
| | | | 370/475 |
| 8,832,446 B2* | 9/2014 | Koppers | G05B 19/4186 |
| | | | 713/176 |
| 9,014,144 B2* | 4/2015 | Kumar | H04W 12/12 |
| | | | 370/331 |
| 9,788,185 B2* | 10/2017 | Seok | H04L 61/2007 |
| 9,843,591 B2* | 12/2017 | Bliss | H04L 63/105 |
| 10,469,513 B2* | 11/2019 | Uppal | H04L 61/6004 |
| 2001/0015965 A1* | 8/2001 | Preston | H04L 61/2007 |
| | | | 370/338 |
| 2003/0185237 A1* | 10/2003 | Baker, Jr. | H04L 67/04 |
| | | | 370/469 |
| 2004/0203824 A1* | 10/2004 | Mock | H04W 48/14 |
| | | | 455/452.1 |
| 2005/0018645 A1* | 1/2005 | Mustonen | H04L 61/6004 |
| | | | 370/349 |
| 2005/0209947 A1* | 9/2005 | Shafer | H04L 61/6004 |
| | | | 705/36 R |
| 2005/0262218 A1 | 11/2005 | Cox et al. | |
| 2014/0047128 A1* | 2/2014 | Correll | H04L 61/6004 |
| | | | 709/245 |
| 2014/0314003 A1* | 10/2014 | Zhou | H04W 52/243 |
| | | | 370/329 |
| 2018/0026941 A1 | 1/2018 | Haensgen et al. | |
| 2018/0063075 A1 | 3/2018 | Eckert et al. | |

OTHER PUBLICATIONS

Jiang, Wireless Communications and a Priority Access Protocol for Multiple Mobile Terminals in Factory Automation, Feb. 1, 1998, vol. 14, pp. 137-143 (Year: 1998) (Year: 1998).*

Agilion; "Wireless Location System;" Oct. 19, 2018; 7 pages; https://web.archive.org/web/20181019004715/http://www.agilion.de/en/wireless-location-system.

Nalin, Michela; "Insutrial Ethernet is now bigger than fieldbuses;" Feb. 27, 2018; 10 pages; https://www.hms-networks.com/press/2018/02/27/industrial-ethernet-is-now-bigger-than-fieldbuses.

MoveNSee; Online Shop; Accessed Sep. 4, 2019; 14 pages; https://shop.movensee.com/en/.

Siemens; Press Releases; Accessed Sep. 4, 2019; 5 pages; https://www.siemens.com/press/en/pressrelease/?press=/en/pressrelease/2018/processindustries-drives/pr2018040214pden.htm&content%5b%5d=PD.

Zebra; Ultra Wideband (UWB) Technology; Nov. 6, 2018; 11 pages; https://www.zebra.com/us/en/solutions/location-solutions/enabling-technologies/dart-uwb.html.

King, Daniel M; "Industrial Wireless Control Using Ultra-Wideband Radio;" Faculty of Computer Science, University of New Brunswick; Apr. 2017; 183 pages; https://www.cs.unb.ca/tech-reports/documents/TR17-239.pdf.

Ratiu, Ovidiu; "Wireless Communication Bus for Satellite Applications WI-SAT;" Oct. 2015; 25 pages; https://indico.esa.int/indico/event/145/contribution/5/material/1/0.pdf.

ESA/ESTEC; "Software Systems Division Data Systems Division, Final Presentation Days;" Jun. 9, 2016; 32 pages; https://indico.esa.int/event/145/attachments/869/1047/Program_and_Abstracts.pdf.

Zebra; Zebra UWB Technology; Dec. 1, 2018; 2 pages.

Siemens; Siemens acquires technology leader in Real-Time Locating System solutions; Apr. 5, 2018; 4 pages; https://press.siemens.com/global/en/pressrelease/siemens-acquires-technology-leader-real-time-locating-system-solutions?content%5b%5d=PD.

Extended European Search Report for Application No. 20177926.1 dated Nov. 4, 2020, 10 pages.

* cited by examiner

GENERATING LOCATION-BASED ADDRESSES FOR WIRELESS NETWORK COMMUNICATION

BACKGROUND

This disclosure relates generally to systems and methods for wireless communication within industrial automation systems. More particularly, embodiments of the present disclosure discusses unique address generation, which may be used within the industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of actuators, such as valves, electric motors, and so forth, a wide range of sensors, other suitable monitoring devices, or the like, which each may respectively collect data via a variety of sensors. One or more components of the automation control and monitoring systems, such as programming terminals, automation controllers, input/output (I/O) modules, communication networks, human-machine interface (HMI) terminals, and the like, may use the statuses and/or received information in providing alerts to operators, in changing or adjusting operation of one or more components of the industrial automation system (e.g., such as adjusting operation of one or more actuators), in managing the industrial automation system, or the like.

Generally, the networked devices described above may be associated with information, such as different statuses, sensing data, or the like. The information may relate to an operation of the industrial automation system and may be monitored by the automation control and monitoring systems. Certain precautions are taken to operate networked devices in industrial automation systems as desired and to transmit the information to automation control and monitoring systems of the industrial automation systems. For example, each networked devices may be assigned a unique address (e.g., a network address) to enable the industrial automation system to identify each networked device interaction with specific devices, data transmitted from the networked device, and the like. With this in mind, it may be useful to use efficient methods for generation of addresses for use as networked addresses in industrial automation systems.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a device may include a first network component that communicates with a second network component of an industrial control system. The device may also include a processor that transmits a first set of signals from the first network component to the second network component. The processor may also receive a response from the second network component and determine a location based at least in part on the response to the first set of signals. The processor may also generate a network address based at least in part on the location.

In another embodiment a system may include a first device and a second device, each including a network component. The network component of the second device may receive information from the network component of the first device based at least in part on a network address. The network address may be generated based at least in part on a location of the first device.

In yet another embodiment, a tangible, non-transitory computer-readable medium configured to store instructions executable by a processor of an electronic device that, when executed by the processor, cause the processor to transmit a first set of signals from a first network component to a second network component. The processor may also be caused to receive a response from the second network component and determine the location based at least in part on the response to the first set of signals. The processor may generate a network address using the location.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
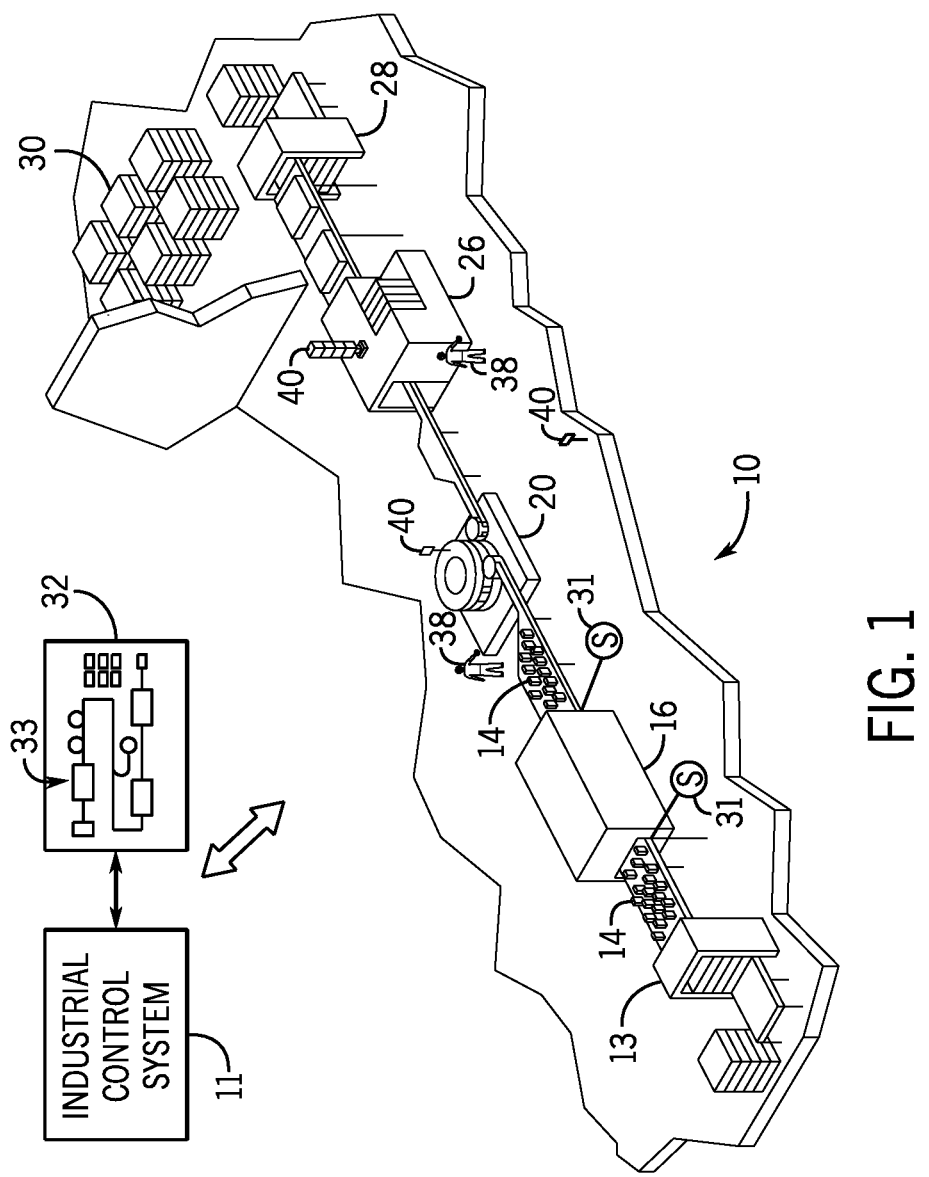
FIG. 1 is a perspective view of an example industrial automation system, in accordance with an embodiment.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards a networked device disposed in an industrial automation system that may determine its location within the industrial automation system and, based on the determined location, generate a unique address (e.g., a network address). That is, the networked device may detect its own location and use the location to generate a unique address. In this way, the networked device may generate a unique address without incorporation of a unique device identifier (e.g., an extended unique device identifier (EUID)) into the unique address. The networked device may operate according to control instructions (e.g., operation parameters, control signals) received via a wireless network using the unique address to reference the networked device. In some embodiments, the networked device may transmit a data packet to an industrial control system that controls the industrial automation system based on the data packet.

When wireless communications use a unique address generated based on a location, certain operations may improve, such as replacement operations of networked devices. For example, a replacement networked device may replace an original networked device that corresponds to a unique address based on its location. After the replacement, the replacement networked device may resume communication via the wireless network using a same unique address as the original networked device. Because the replacement networked device is installed into a same location as the original networked device, the unique address remains unchanged after the replacement.

After the replacement, references to the unique address of the original networked device do not have to be updated in response to the replacement networked device being installed. For example, a human-machine interface (HMI), a controller, other networked devices, or the like, communicating with the replacement networked device may use the same unique address as it did with the original networked device. Furthermore, system configurations may not be automatically updated or automatically re-determined in response to the replacement networked device being installed. For example, a unique address generated using hardware identifiers may change as a result from the replacement because the hardware changed with the replacement. When a pre-replacement unique address is different from a post-replacement unique address, references to the pre-replacement unique address may be updated after the replacement to reference the post-replacement unique address to preserve communication with the replacement networked device. This update process is inefficient and may sometimes lead to references or configurations being overlooked (e.g., not updated, skipped). By using the techniques described herein, the unique address is not changed during the replacement, and thus the update process does not have to be performed after the replacement.

Furthermore, the techniques described herein may be used to improve security of the wireless communication network. For example, a location for a networked device may be determined, and a mapping function may be applied to the location to generate a pseudo random number. The pseudo random number may be used to generate a code for use in a unique address for the networked device. The mapping function may use a known algorithm to convert the location into the pseudo random number. That is, devices permitted within the industrial automation system may be aware of the known algorithm and able to recreate the pseudo random number from the location. Devices external to the industrial automation system (e.g., unpermitted devices) may be unaware of the known algorithm and unable to recreate the pseudo random number from the location. The mapping function may be any suitable private algorithm that devices of the industrial automation system are privy to but unpermitted devices do not know. For example, the mapping function may use a public-private key pair, a common private key, a hash value, a hash-based algorithm, a cryptography technique used to generate the random number that the code is based on, or the like, to generate the pseudo random number based on the location.

In some embodiments, the generated pseudo random number may be mapped to a code to be used in the unique address. Codes for each expected location of a networked device may be stored and accessible by the industrial automation system for determining whether a new networked device is authorized. Thus, the industrial automation system may permit or deny a new device into the network based on the code of the unique address. For example, the industrial automation system may reference a list of permitted codes when determining whether to enable communication with a new device via the network. In this way, access may be denied to a new device that does not communicate using an approved code, therefore promoting and improving security of the industrial automation system.

By way of introduction, FIG. 1 is a perspective view of an example industrial automation system 10 controlled by an industrial control system 11. The industrial automation system 10 includes stations having machine components and/or machines to conduct a particular function within an automated process, for example, a beverage packaging process, as is depicted. The automated process may begin at a station 13 used for loading objects, such as empty cans or bottles to be filled, into the industrial automation system 10 via a conveyor section 14. The conveyor section 14 may transport the objects to a station 16 to perform a first action, for example, washing the empty cans and/or bottles. As objects exit from the station 16, the conveyor section 14 may transport the objects to a station 20, such as a filling and sealing station, in a single-file line. A second conveyor section 14 may transport objects from the station 20 to a station 26. After the objects proceed through the various stations, the objects may be removed from the station 28, for example, for storage in a warehouse 30. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications.

Additionally, the industrial automation system 10 may include various types of equipment that may perform the various operations as part of an industrial application. For instance, industrial automation system 10 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like.

In certain embodiments, one or more properties of the industrial automation equipment, such as the station 16, may be monitored and controlled by an industrial control system 11 for regulating control variables. For example, sensing devices (e.g., sensors 31) may monitor various properties of the industrial automation system 10 and may be used in adjusting operations of the industrial automation system 10. In some cases, the industrial automation system 10 may be associated with devices used by other equipment. For instance, scanners, gauges, valves, flow meters, and the like may be disposed on the industrial automation system 10. Here, the industrial control system 11 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control system 11 may be communicatively coupled to a display/operator interface 32 (e.g., a HMI) and to devices of the industrial automation system 10. Although one industrial control system 11 is depicted, it should be understood that any suitable number of industrial control systems 11 may be used in a particular industrial automation system 10 embodiment. The industrial control system 11 may represent components of the industrial automation system 10 through programming objects that may be instantiated and executed to provide simulated functionality similar or identical to the actual components, as well as visualization of the components, or both, on the display/operator interface 32. The programming objects may include code and/or instructions stored in the industrial control system 11 and executed by processing circuitry of the industrial control system 11. The processing circuitry may communicate with memory circuitry to permit the storage of the component visualizations.

As illustrated, the display/operator interface 32 depicts representations 33 of the components of the industrial automation system 10. The industrial control system 11 may use data transmitted by sensors 31 to update visualizations of the components via changing one or more statuses, states, and/or indications of current operations of the components. These sensors 31 may be any device adapted to provide information regarding process conditions. Indeed, the sensors 31 may be used in a process loop monitored and controlled by the industrial control system 11. As such, a process loop may be activated based on process inputs (e.g., an input from the sensor 31) or direct input from a person 38 via the display/operator interface 32. The person 38 operating and/or monitoring the industrial automation system 10 may reference the display/operator interface 32 to determine various statuses, state, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial control system 11 may use networked devices 40 in managing operation of the industrial control system 11. The networked devices 40 may be any suitable device within the industrial automation system 10 that communicates a status, a data packet, an alert, or the like, to the industrial control system 11 and/or other networked devices 40. For example, the networked device 40 may be processing circuitry coupled to an example sensor 31 that enables the sensor 31 to transmit sensing data to the industrial control system 11. As an additional example, the network of the industrial control system 11 may enable communication between an example networked device 40 including the sensor 31 and another networked device 40 that controls an operation of a component (e.g., motor, valve) based on data packets generated via the sensor 31.

The network of the industrial control system 11 may be a wired network, a wireless network, and/or a combination of the two. Some addressing between networked devices 40 may be implicit, such as is the case in wired networks. However, in wireless networks, a networked device 40 may use a unique address to communicate via the network. The unique address may include information at least identifying that a particular transmission originated from the networked device 40. The unique address may be associated with a data packet to help the industrial control system 11 transmit the data packet between networked devices 40.

These addressing operations may be used for a variety of operations. For example, a processor that generates a graphical user interface indicative of a current operation of the industrial automation system 10 may communicate with the networked devices 40 to retrieve data indicative of the current operation. As another example, a processor of the industrial control system 11 may operate a control value to open by referencing a specific actuator via its unique address. Many of the communications between networked devices 40 and/or the industrial control system 11 may use unique addresses to particularly transmit or receive data packets.

In some cases, the unique address may be assigned to a networked device 40 based on a device identifier of the networked device 40. However, when the networked device 40 associated with the unique address is replaced with hardware having a new device identifier, the unique address for the networked device 40 changes. When the unique address changes, references to the original unique address have to be updated to reflect the new unique address. Updating the unique address may be time-consuming, complex, inefficient, and so on, relative to not updating the unique address and leaving the original unique address as-is.

Keeping the forgoing in mind, a unique address may be generated based on a location of the networked device 40 instead of based on the device identifier of the networked device 40. When an original networked device 40 is replaced with a replacement networked device 40, an original unique address based on the location of the networked device 40 does not have to be updated to a replacement unique address because the location does not substantially change.

Figure 2:
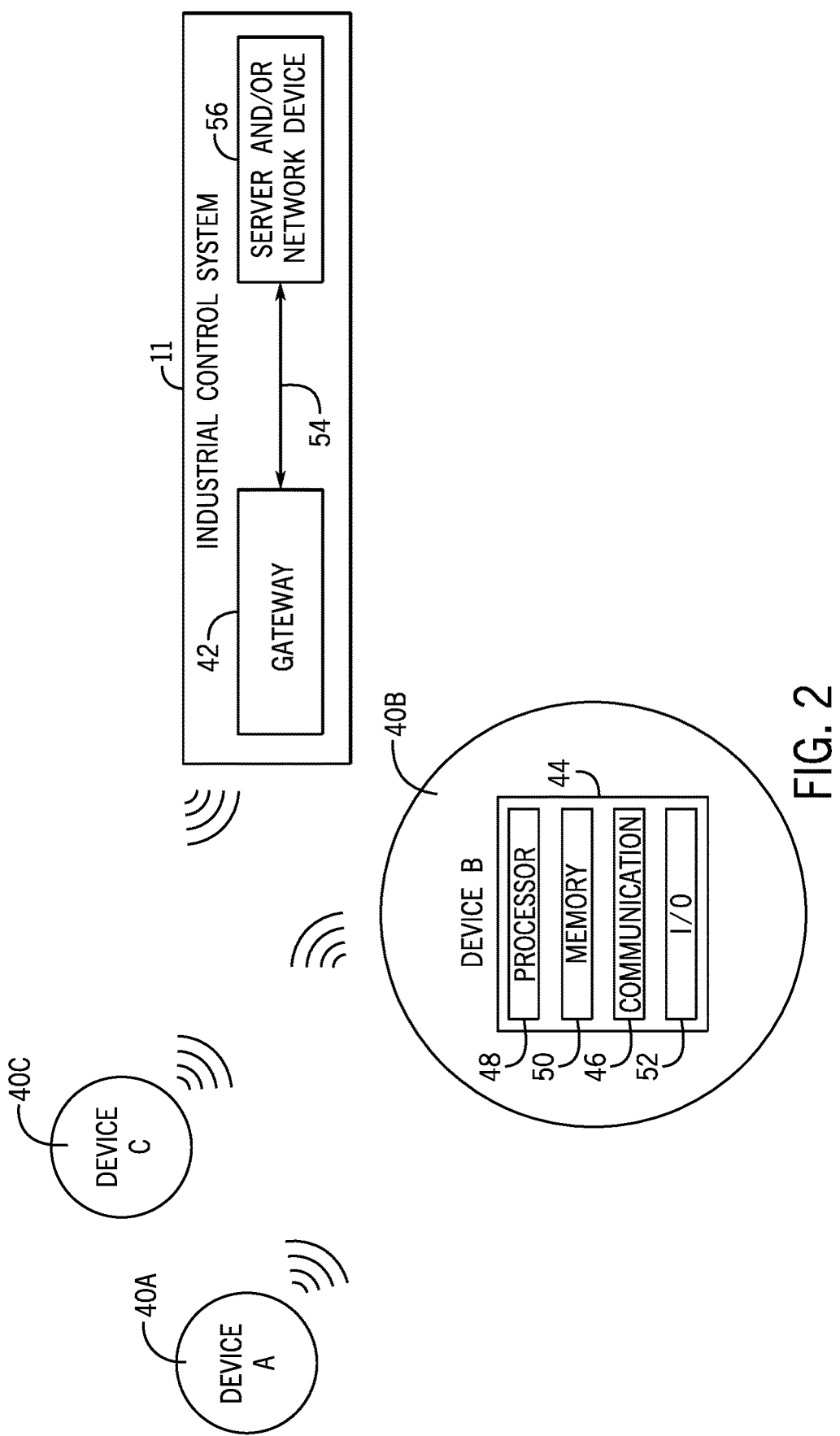
FIG. 2 is a block diagram of an example device of the industrial automation system of FIG. 1, in accordance with an embodiment.

To help elaborate, FIG. 2 is a block diagram of an example networked device 40 of the industrial automation system 10 and includes a representation of three networked devices 40 (40A, 40B, 40C). The networked devices 40 are shown as each wirelessly communicating with the industrial control system 11 via a gateway 42 (e.g., a gateway device). As used herein, the term networked device 40 may refer to networked devices 40 of FIG. 1 and/or any other suitable status or information emitting device that communicates in some way via a wireless network. For example, the networked device 40 may also refer to at least a portion of devices and/or components associated with stations 13, 16, 20, 26, and/or 28, the warehouse 30, the sensors 31, the conveyer sections 14, and the like. Furthermore, in some cases, the networked devices 40 may be retrofitted onto an existing device and/or component of the industrial automation system 10.

The networked devices 40, the gateway 42, the server and/or network device 56, any other suitable devices of the industrial automation system 10, or the like, may each include processing circuitry 44 including a communication component 46, a processor 48, a memory 50, I/O ports 52, or the like. The communication component 46 and/or the gateway 42 may be a wireless or a wired communication component that may facilitate communication between the networked device 40 and other networked devices 40, machines having communication functionalities, components having communication functionalities, and/or the industrial control system 11 via a network 54. For example, the communication component 46 and/or the gateway 42 may each be a radio and/or include one or more radios (e.g., integrated radios of the networked device 40). The networked device 40 via the communication component 46 and/or the gateway 42 may communicate using ultra-wide band wireless radio technology that includes both communication and location functionalities within components of the radios (e.g., integrated communication-location functionalities), however other suitable wireless communication may be used by the networked device 40 and/or the gateway 42. For example, the networked device 40, the communication component 46, and/or the gateway 42 may leverage technologies that do not integrate communication and location functionalities, and instead have at least partially separate components for performing communication operations and/or for performing locating operations. These wired or wireless communication protocols may include any (or use any) suitable communication protocol include Wi-Fi, mobile telecommunications technology (e.g., 2G, 3G, 4G, long term evolution (LTE) enabled devices), Bluetooth®, near-field communications technology, and the like. The communication component 46 may include a network interface to enable communication via various protocols such as Ether-Net/IP®, ControlNet®, DeviceNet®, or any other industrial communication network protocol.

The processor 48 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 48 may, in some embodiments, include multiple processors. The memory 50 may include any suitable articles of manufacture that serve as media to store processor-executable code, data, or the like. The memory 50 may store processor-executable code, that when executed, cause the processor 48 to perform the presently disclosed techniques.

In general, these components of the networked devices 40 may generate data packets and/or other suitable information that is to be communicated via a wireless network to another component, such as a server and/or a network device 56 coupled to the gateway 42 via a network 54. A networked device 40 may transmit information to the gateway 42 and/or other suitable networked device 40 using communication components 46, other suitable radio circuitry, and/or unique addresses for each participating device. For example, the networked device 40C may transmit information via its communication component 46 to the gateway 42 based on the unique address for the networked device 40C. As another example, the gateway 42 may transmit information via its communication component 46 to the networked device 40A indicating its destination via the unique address for the networked device 40A. The unique address may be selected such that the networked device 40B has a different unique address than the networked device 40A and the networked device 40C. In this way, each of the networked devices 40 may respectively communicate through the wireless network based on respective unique addresses. Advantages to basing unique addresses on locations of networked devices 40, rather than on unique identifiers of the networked devices 40, at least include an increased ease of replacement and improved security.

Figure 3:
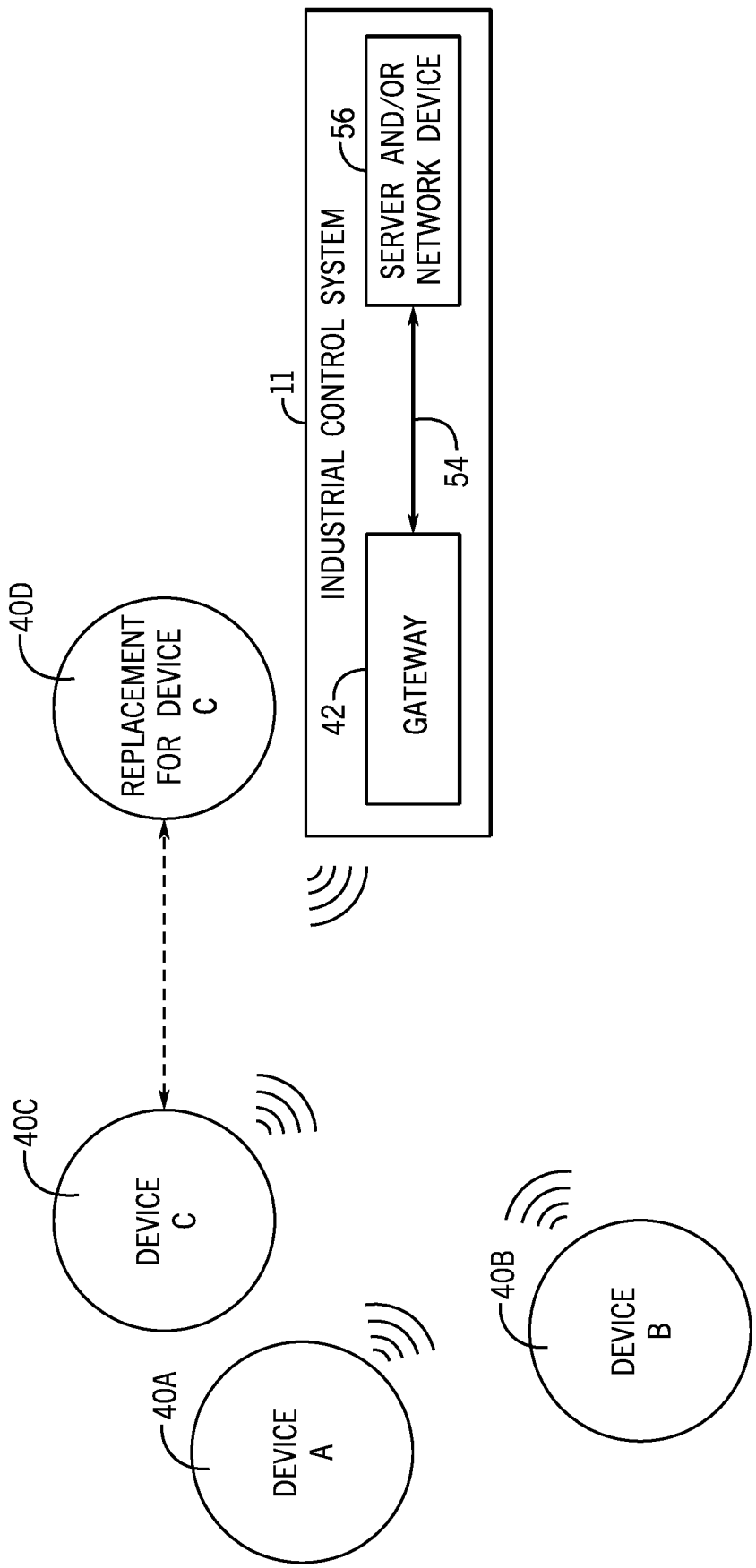
FIG. 3 is a block diagram of the device of FIG. 2 being replaced by a different device in a same location of the industrial automation system of FIG. 1, in accordance with an embodiment.

FIG. 3 is a block diagram of the networked devices 40, where the networked device 40C has undergone a device replacement. In this example, the networked device 40C is or is being replaced by the networked device 40D. When the networked device 40C is replaced, the networked device 40D is located in a substantially similar location (e.g., same location) as the networked device 40C. Since the location did not change of the networked device 40D, the unique address is not updated in response to the replacement.

For example, before a device replacement, the industrial control system 11 may communicate with the networked device 40C using a first unique address. After the networked device 40C is replaced by the networked device 40D, the industrial control system 11 may communicate with the networked device 40D using the same first unique address, even despite the device replacement. Generating the unique address based on locations of networked devices 40 may reduce down-time (e.g., shutdown or offline time periods of the industrial automation system 10 due to a device replacement) and may decrease addressing errors from updating unique addresses that sometimes lead to inaccurate operation of the industrial automation system 10.

Figure 4B:
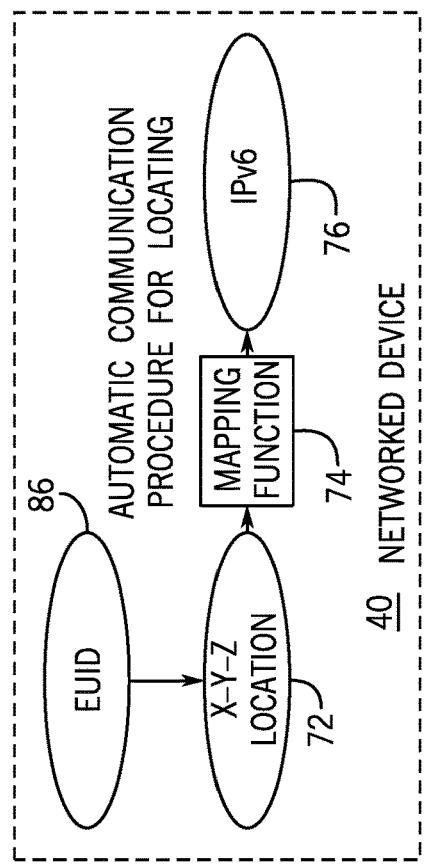
FIG. 4B is a block diagram of an example mapping function from FIG. 4A, in accordance with an embodiment.
Figure 4A:
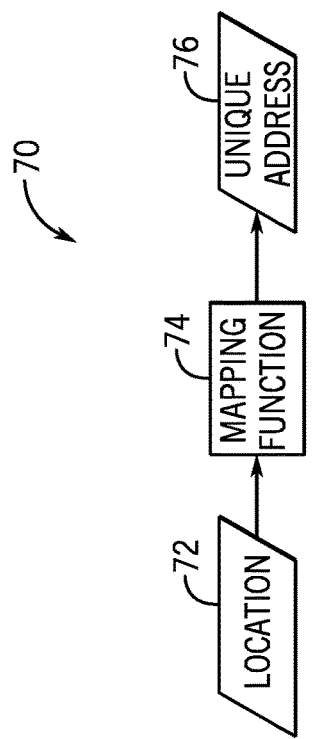
FIG. 4A is a block diagram of a location being converted via a mapping function into a unique address, in accordance with an embodiment.

To elaborate on the present disclosed embodiments regarding unique address generation, FIG. 4A is a block diagram 70 of a location 72 converted into a unique address 76 via a mapping function 74. Although the mapping function 74 is described below in generalized terms, it should be understood that any methods associated with the mapping function 74 and/or the block diagram 70 may be performed by any suitable processor (e.g., the industrial control system 11, one or more networked devices 40) to generate the unique address 76. Moreover, although the following description of the mapping function 74 is described in a particular order and as associated with particular inputs and outputs, it should be noted that the methods may be performed in any suitable order and/or generate any number of suitable outputs based on any number of suitable inputs. The mapping function 74 may map the location 72 (or other suitable ranging values) to generate the unique address 76 (e.g., a unique addressing value).

The location 72 may correspond to a physical and/or logical location of the networked device 40 within the industrial automation system 10. The location 72 may be defined coordinates within a space (e.g., plane, volume, or the like), defined relative to other networked devices 40, defined relative to one or more features (e.g., physical-based, logical-based, device-based) of the industrial automation system 10, predetermined at a time of installation of the networked device 40, or the like. In this way, the location 72 may be defined based on one or more global positioning system (GPS) signals, time of flight (ToF) calculations (e.g., calculations or determinations based at least in part on a rate of propagation of a signal through air), nearby cell phone signals, or the like. For example, the ToF calculations may be based on an expected rate of propagation of a signal through air and based on a difference between a time of transmission and a time of reception of the signal. Indications of the locations 72 may be stored in a suitable data store, such as a table, database, tangible memory, server (e.g., server and/or network device 56), or the like.

The location 72 may be determined relative to a non-moving, physical aspect of the industrial automation system 10, such as a staircase, a doorway, a wall, a pillar, machinery that is disposed at a constant location (despite having optionally moving components, such as a motor or a fan), or the like, that may be used as reference points in determining the location of the networked device 40. These are examples of physical-based features. Examples of logical-based features may be defined as digital points-of-interest within confines of a site map, or otherwise indicated in memory, to use as reference points in determining the location of the networked device 40. For example, a location of a networked device 40 may be stored as a logical-based feature since it is relatively less permanent as a point of interest than a physical aspect of the industrial automation system 10. A site map may be stored in a memory or a server. The site map may supply indications of where features are distributed within physical confines of the industrial automation system 10. The features may include logical-based features and/or physical-based features, and thus may be used to determine a distance between a feature of the site map and the networked device 40.

Sometimes, the location 72 may be determined via a real-time locating systems (RTLS). RTLS may automatically identify and track objects and/or operators in real-time within a monitored area (e.g., a building, defined region, defined volume, defined region, defined area, cabinet, automation unit, or the like). The industrial control system 11 may reference a tag disposed on a physical surface of the networked device 40 when determining the location 72 of the networked device 40. RTLS, and other locating operations of the industrial automation system 10, may use any suitable distance determination technique when determining the location 72 of the networked device 40. For example, sensors that leverage radio frequency waveforms, laser or light waveform, acoustic waveforms, or the like, may help determine the location 72.

Furthermore, there may be some examples where distance measurements are used instead of and/or to supplement the determined location of the networked device 40 when determining the code. For example, using a distance between a networked device and a beacon device may be used in determining the unique address rather than an exact location of the networked device.

The mapping function 74 may use the location 72 to generate the unique address 76. The mapping function 74 may be any suitable private algorithm that other networked devices 40 and the industrial control system 11 know but devices external to the industrial automation system 10 (e.g., unauthorized devices) do not know. For example, the mapping function 74 may use a public-private key pair, a hash value, a hash-based algorithm, a cryptography technique used to generate the random number that the code is based on, or the like, to generate the random number based on the location. The generated random number may be mapped to a code to be used in the unique address 76.

In some embodiments, the industrial control system 11 may manage unique addresses for each approved and/or expected transmitting location within the industrial automation system 10. For example, the industrial automation system 10 may reference a preset list of codes permitted to communicate with other devices of the industrial automation system when determining whether to enable communication with a new device via the network. The industrial control system 11 may permit or deny a new device to communicate via the network based on the code of the unique address 76. In this way, access may be denied to a new device that does not communicate using an approved code, therefore promoting and improving security of the industrial automation system.

The unique address 76 may be of any suitable address form, format, compliant with any addressing protocol, or the like. For example, the unique address 76 may include a network prefix and an interface identification (interface ID). The network prefix may include a global routing prefix and a subnet identification (subnet ID). The code generated based on the location may be used as the interface ID, or as a part of the interface ID. The interface ID may be appended to the network prefix, such as after the global routing prefix and the subnet ID. The subnet ID may be used in wireless networks sub-divided into subnets (e.g., logically divided networks of the overall wireless network), wherein the subnet ID identifies which subnet to use for communication with the networked device 40.

Additionally or alternatively, each of these described portions of an example unique address 76 may correspond to any suitable size. For example, the global routing prefix may be a 45-bit string corresponding to a provider. In this way, the subnet ID may be a 16-bit string corresponding to a site and/or the code may be a 64-bit string corresponding to a host (e.g., the networked device 40). In some embodiments, the network prefix is appended to a start-code (e.g., a 3-bit initialization string, "001") that identifies a unique address 76 follows the start-code.

In general, the mapping function 74 may be of any suitable format to generate a unique address 76 based on the location 72 and compatible with the network of the industrial control system 11. Thus, in some embodiments, the mapping function 74 may generate the unique address 76 based on both the location 72 and on particular network compatibility requirements. Thus, the mapping function 74 may permit compatibility between other components and/or existing infrastructure of the industrial automation system 10 by how the code is used to generate the unique address 76.

To help illustrate an example mapping function 74 that generates an example unique address 76, FIG. 4B is a block diagram of an example mapping function 74 that generates the unique address 76 based at least in part on the location 72. In this particular example, the mapping function 74 generates the unique address 76, such that the unique address 76 is compliant for use in an Internet Protocol-based network, in particular Internet Protocol version 6 (IPv6). The IPv6 compatible unique address 76 is generated by the mapping function 74 based on the location 72.

In this example, the location 72 is a coordinate-based location defined in terms of an x-position, a y-position, and a z-position in space (e.g., X-Y-Z location). Each of the x-position, y-position, and z-position are determined distances from a reference point (e.g., an origin). When the location 72 is an X-Y-Z location, the location 72 corresponds to a location within a physical volume of the industrial automation system 10 determined through relative distances between the networked device 40 at the location 72 and reference points. The relative distances may be determined based on communication with one or more beacon devices and/or based on known locations of reference points, such as from a site plan. A beacon device may be a networked device 40 that may emit locating signals for use in determining the location 72 and/or may correspond to a known location, such that determining a relative distance to the beacon device helps to determine the location 72.

When considered a volume, the industrial automation system 10 may be defined into a variety of partitions (e.g., two-dimensional (2D) regions, smaller volumes or three-dimensional (3D) regions). An example of a partition may be a representative cube of volume defined over a portion of an x-axis, a portion of a y-axis, and a portion of a z-axis. A respective partition may be defined based on a range of each axis that belongs to that respective partition. Therefore, each partition may have a different definition. For example, adjacent partitions along the x-axis may correspond to boundary ranges [x1, y1, z1]=[0:2, 0:1, 0:3] and [x2, y2, z2]=[2:4, 0:1, 0:3]. Definitions of the partitions may be stored in a memory and/or a server, and be accessible when determining the location 72. For example, the networked device 40 may be located at any place within a partition and a same location of the partition may be used as the location 72 for the networked device 40. Thus, even if the networked device 40 were moved within the boundary ranges of the partition, the unique address corresponding to the location 72 is unchanged.

In this example, the location 72 is determined based on an automatic communication procedure for locating the networked device 40 within the industrial control system 11. This particular automatic communication procedure is performed by the networked device 40 in this example (as labeled).

It is noted that in some embodiments, a unique device identifier is associated with the networked device 40 installed at the location 72. For example, the unique device identifier may be an alphanumeric series of characters, an extended unique device identifier (EUID) 86, or the like. Similar to how locations 72 are stored, a listing or collection of EUIDs 86 corresponding to particular locations 72 may be stored in any suitable data store and accessible by processing circuitry.

Figure 5:
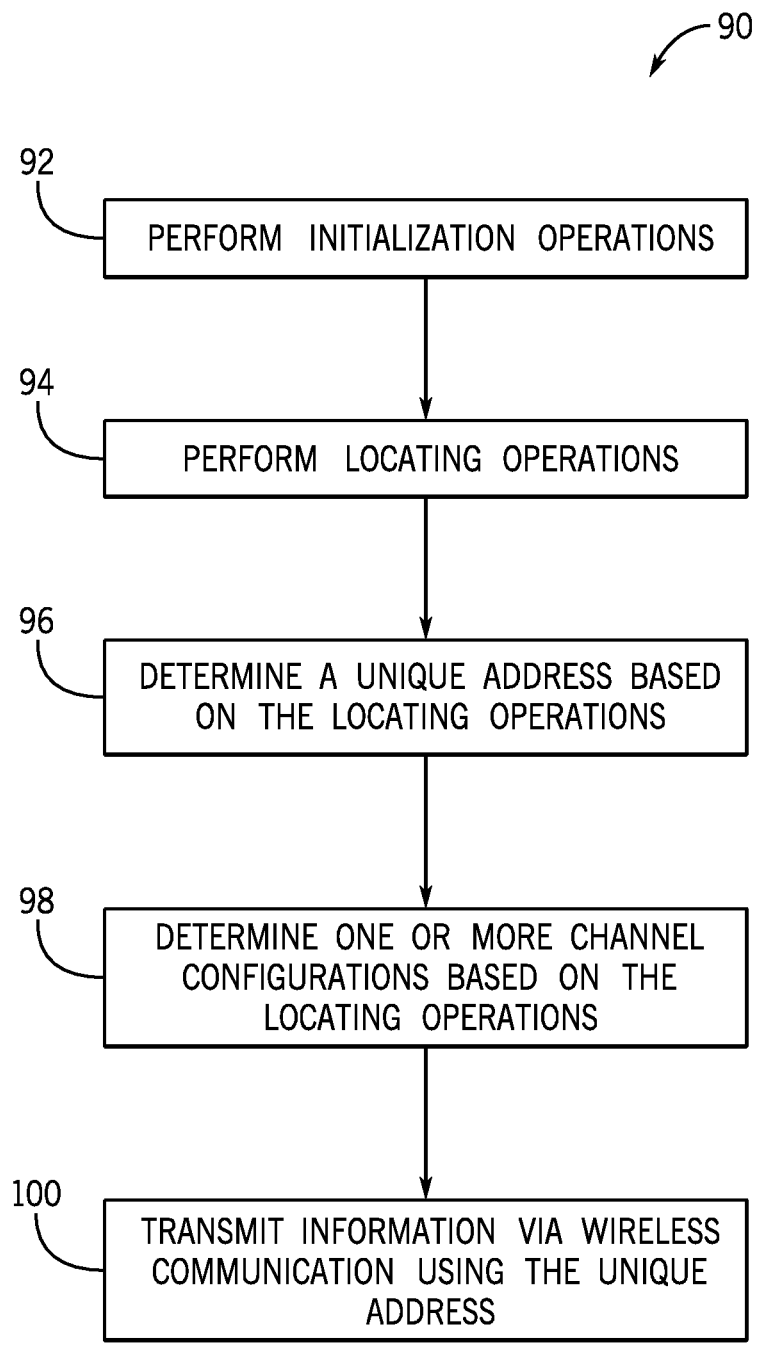
FIG. 5 is a flowchart of a first method for determining a unique address for the networked device of FIG. 2, as illustrated in FIG. 3, in accordance with an embodiment.

FIG. 5 is a flowchart of a method 90 for determining a unique address (e.g., the unique address 76) for the networked device 40. The method 90 may be performed by the networked device 40 to self-generate its unique address based on its location. Although the method 90 is described below as being performed by the networked device 40, it should be understood that any suitable processing device, such as the industrial control system 11 (e.g., via the gateway, via the server and/or network device), may perform the method 90. Moreover, although the following description of the method 90 is described in a particular order, it should be understood that the method 90 may be performed in any suitable order.

At block 92, the networked device 40 may perform initialization operations. These initialization operations may be activities and/or installations that the networked device 40 performs when initially powering-on or initially connecting to a network. The networked device 40 may use the initialization operations to setup or otherwise prepare itself for use within the industrial automation system 10.

At block 94, the networked device 40 may perform locating operations. The locating operations may include referencing determining the location of the networked device 40 by referencing a data store, determining relative distances between the networked device 40 and other networked devices 40, using global positioning system (GPS) techniques, or the like. In some embodiments, the networked device 40 may use one or more integrated radios to determine its location. The integrated radio, or other suitable broadcasting and/or signal generation device, may communicate with nearby radios of other networked devices 40 and/or GPS to determine the location of the networked device 40. For example, the networked device 40 may use its integrated radio as part of a triangulation operation to leverage communication links with nearby networked devices 40 in determining the location. Additionally or alternatively, the networked device 40 may identify an additional networked device 40 as an anchor and reference the anchor as part of ranging operations to determine the location. For example, the anchor may be a digital-point-of-interest, a physical-feature, or may otherwise have a known location, where by determining a location relative to the anchor, the network device 40 may determine its own location.

Additionally or alternatively, the networked device 40 may locate itself on a site plan or otherwise provided computer-readable map of the industrial automation system 10 that enables the networked device 40 to identify the location relative to digital-points-of-interests and/or physical-features of the site plan, or an otherwise provided computer-readable map of the industrial automation system 10. The site plan may be generated at a time of construction of the industrial automation system 10.

At block 96, the networked device 40 may determine a unique address based on the locating operations. The networked device 40 may use a mapping function (e.g., mapping function 74) specific to at least one wireless network of the industrial automation system 10 to generate the unique address based on the locating operations. The mapping function may use a location determined by the networked device 40 to generate the unique address. The networked device 40 may apply the mapping function via a software application, code, processing circuitry, or the like to change the location determined into a unique address. If the networked device 40 performs the method 90 after a replacement installation, the networked device 40 may generate, at the block 96, a same unique address as the networked device 40 being replaced.

After generation of the unique address, the networked device 40 and/or the industrial control system 11 may intercommunicate based on the respective unique address for each component. The unique address may be a series of bits, characters, identifiers, or the like that identify the networked device 40 to a receiving device (e.g., gateway 42 of the industrial control system 11, another networked device 40) associated with a current data transmission. The networked device 40 may know the address of the receiving device prior to determining its own unique address. When the networked device 40 does not know the address of the receiving device, the networked device 40 may use one or more broadcast definition operations to contact the receiving device. In some cases, the receiving device is already expecting a replacement when the networked device 40 begins the broadcast definition operations, so the receiving device may verify or authenticate the replacement networked device 40 based on the unique address. The broadcast definition operations may include interrogating nearby devices based at least in part on a device type, a hardware revision installed on the devices, a software revision installed on the devices, or the like, before communication between the receiving device and the networked device 40 happens. In this way, components of the wireless network, such as routers, may transmit a data packet including the unique address to a particular end networked device 40 associated with the unique address.

At block 98, the networked device 40 may determine one or more channel configurations based on the locating operations. While performing the method 90, the networked device 40 may be communicatively coupled to the industrial control system 11 via an initialization channel. Within wireless networks, sometimes networked devices 40 may communicate with the industrial control system 11 on different channels. A channel may segregate wireless transmissions into different frequency ranges, or other suitable wave properties. In this way, a first networked device 40 communicating on a first channel may not interfere data packet transmission of a second networked device 40 via a second channel. Although one or more networked devices 40 may intercommunicate on a same channel, sometimes separating communications onto different channels improves organization of the communications. This may enable wireless communications to be organized based on a category of communication and/or based on a desire to balance communications between channels.

With this in mind, after the networked device 40 determines its unique address, the networked device 40 may determine one or more channel configurations based on the unique address and/or the determined location (e.g., a result from the locating operations). The channel configuration may include one or more properties via which the networked device 40 communicates. Properties may include a determined communication channel, a determined transmitter power, a transmitting frequency, or the like. To elaborate, the determined communication channel may be defined via a range of transmitting frequencies for a respective channel. In addition, the determined transmitter power may indicate a power level to supply to a transmitter of a radio during communication. Furthermore, a transmitting frequency may indicate a frequency that a radio is to transmit data packets at. Processing circuitry of the networked device 40 may reference one or more of the properties when transmitting via the network. For example, the processing circuitry may change a power supplied to a radio component based on the determined transmitter power or may change a frequency range used by the radio component based on the determined communication channel and/or the transmitting frequency. The determination operations may involve the networked device 40 determining which channel is relatively the best for communication via the network. When the network device 40 is installed to replace a different networked device 40 previously at the same location, the networked device 40 may determine the channel configurations by retrieving stored channel configurations from a previous determination associated with the determined location. Retrieving the channel configurations may use fewer computing resources and/or reduce an amount of time the networked device 40 is out of service for the replacement.

At block 100, the networked device 40 may transmit information, via the network, using the unique address and/or the channel configurations. The unique address may be a readable name, identifier, or the like that indicates the networked device 40 and its data packet transmitted. In some cases, the unique address is used along with an address corresponding to a receiving networked device 40 and/or a receiving component of the industrial control system 11.

Figure 6:
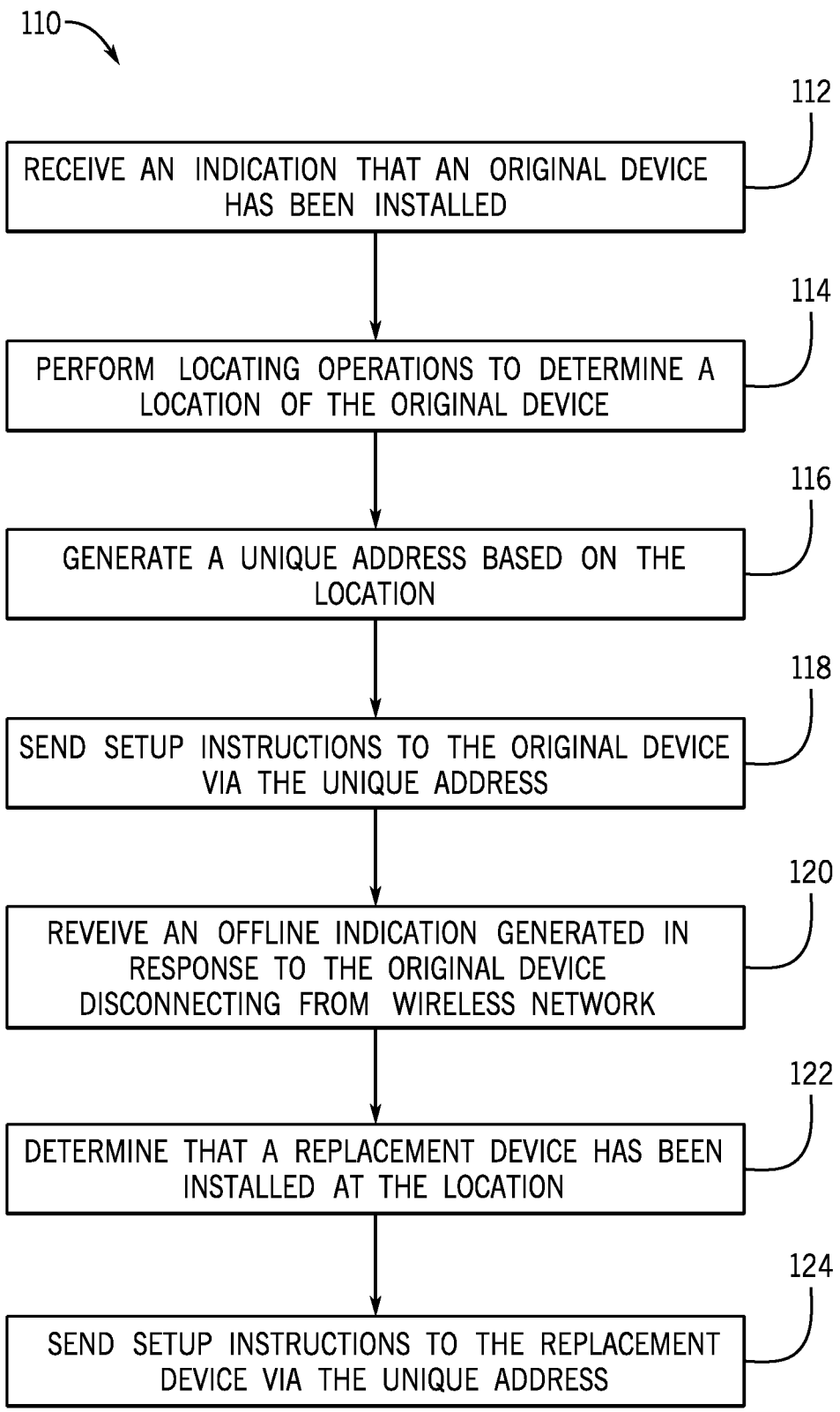
FIG. 6 is a flowchart of a second method for determining a unique address for a networked device of FIG. 2, in accordance with an embodiment.

The method 90 of FIG. 5 is performed by the networked device 40 (such as, via processor 48) when the networked device 40 is to perform initialization and address determination operations. In some embodiments, the industrial control system 11 may determine a unique address for a new networked device 40 or for a replacement networked device 40 installed in the industrial automation system 10. FIG. 6 describes a method that may be a complementary procedure to operations of the method 90. For example, when the replacement networked device 40 generates its own unique address (e.g., by following the method 90), the replacement networked device 40 may then receive setup instructions from a suitable instruction-sending device (e.g., a networked device 40, a gateway 42 of the industrial control system 11) via at least a portion of operations of FIG. 6. FIG. 6 generally describes a method of how the instruction-sending device may know the location-based unique address of the replacement networked device 40.

Keeping this in mind, FIG. 6 is a flowchart of another method 110 for determining a unique address (e.g., the unique address 76) for the networked device 40. Although the method 110 is described below as performed by the industrial control system 11, it should be understood that any suitable processing device may perform the method 110. Moreover, although the following description of the method 110 is described in a particular order, it should be understood that the method 110 may be performed in any suitable order. The method 110 may be used to determine a unique address for another device (e.g., replacement networked device 40) and sending information to the device using the unique address. In this way, at least a portion of the method 110 and the method 90 may be performed in parallel, or partially in parallel. Performing some or all of the method 90 in parallel with some or all of the method 110 may further increase efficiency of network device 40 installation and/or set up.

At block 112, the industrial control system 11 may receive an indication that a networked device 40 has been installed (e.g., an installation indication). The industrial control system 11 may classify a networked device 40 as an original networked device 40 when the industrial control system 11 determines that this networked device 40 is a first networked device 40 to be installed in a particular location. In some cases, the industrial control system 11 may operate in an initialization mode where the industrial control system 11 assumes each networked device 40 that is detected as installed corresponds to an original networked device 40. For example, when operated in the initialization mode, such as during a start-up of the industrial automation system 10, the industrial control system 11 may automatically categorize each networked device 40 detected during this time to be an original device.

At block 114, the industrial control system 11 may perform locating operations to determine a location of the original networked device 40. To do this, the industrial control system 11 may retrieve a predetermined location of the networked device 40 from memory 50, perform a triangulation operation to determine the location of the original networked device 40 relative to other networked devices 40, determine the location using GPS techniques, reference a site plan to determine the location of the networked device 40, or the like. In this way, the industrial control system 11 may use one or more of the techniques described at the block 94. After the industrial control system 11 determines the location of the original networked device 40, the industrial control system 11 may save the location to a memory 50 and verify that the location is saved to the memory 50.

At block 116, the industrial control system 11 may generate a unique address based on the location of the original networked device 40 determined at block 114. The industrial control system 11 may use a mapping function (e.g., mapping function 74) specific to at least one wireless network of the industrial automation system 10 to generate the unique address for the location. The mapping function may use the determined location to generate the unique address. The industrial control system 11 may apply the mapping function to change the determined location into at least a portion of the unique address. For example, the mapping function may use the determined location to generate a code that is used in the unique address. As a reminder, the mapping function may be any suitable cryptographic conversion known by authorized devices and unknown by unauthorized devices. Upon generation of the unique address, the original networked device 40 and/or the industrial control system 11 may intercommunicate using the respective unique address.

In response to generating the unique address, the industrial control system 11 may, at block 118, send setup instructions to the original networked device 40 using the unique address. The original networked device 40 may know on what address to receive the instructions on based on its generated unique address, such as the unique address generated via the method 90. The setup instructions may be any suitable instructions that are used to setup operation of the original networked device 40 within the industrial automation system 10. The setup instructions may include channel configuration information, set points, operational information or settings, alarm configurations, naming configurations, or the like. For example, set points may define default operational ranges that the networked device 40 is to operate in accordance and alarm configurations may define thresholds that an exceedance of may trigger an alarm. Setup instructions may also include configuration software or the like for initializing the networked device 40 for operation. After setup instructions are suitably applied to the original networked device 40, the industrial automation system 10 may interact with and/or use the original networked device 40 as part of control operations.

After a period of time, at block 120, the industrial control system 11 may receive an offline indication. The offline indication may be generated in response to the original networked device 40 being taken off the network, such as due to powering off, being taken offline for inspection or replacement, or the like. In some embodiments, the offline indication is merely a lack of an online indication, where the lack of the online indication is interpreted by the industrial control system 11 as an offline indication.

Furthermore, in some cases, the industrial control system 11 may receive a notification that accompanies the offline indication, such as to notify the industrial control system 11 approved replacement operations are happening. In these embodiments, the industrial control system 11 may alarm, generate a signal that generates an audible alarm, a visual alarm, generates a window on a HMI, or the like, in response to receiving an un-approved offline indication, or an offline indication not accompanied by the additional notification. The lack of the notification with the offline indication may be interpreted by the industrial control system 11 as potentially fraudulent replacement operations and/or replacement operations happening outside of operating protocol.

At block 122, the industrial control system 11 may determine that a replacement networked device 40 has been installed at the same or substantially similar location of the original networked device 40. After the industrial control system 11 receives the offline indication, the industrial control system 11 may wait for an additional installation indication transmitted in response to a networked device 40 powering on and wirelessly transmitting an installation indication (e.g., such as the installation indication transmitted at block 112). In this way, the industrial control system 11 is expected a replacement networked device 40. When a networked device 40 is installed in a substantially similar or same location as the original networked device 40, the industrial control system 11 may understand the networked device 40 to be a replacement networked device 40 or otherwise authenticate the replacement networked device 40. In response to determining that the replacement networked device 40 is installed, the industrial control system 11 may proceed to associate the unique address determined at the block 116 with the replacement networked device 40.

At block 124, the industrial control system 11 may send setup instructions to the replacement networked device 40 using the unique address determined at the block 116. Communication between the industrial control system 11 and the replacement networked device 40 is permitted because both devices may independently determine the same unique address based on the location of the replacement networked device 40. These setup instructions may be substantially similar to the setup instructions sent, at block 118, to the original networked device 40. Furthermore, in some embodiments, the setup instructions may include system configurations or settings implemented into the original networked device 40 before the replacement. The setup instructions may enable the replacement networked device 40 to operate substantially similar to the original networked device 40.

As described above, the location of the networked device 40 may be determined by the networked device 40 and/or the industrial control system 11. The location may be a specific GPS coordination combination, relatively defined based on the locations of two networked devices 40, relatively defined based on the locations of three networked devices 40, or the like. Furthermore, the location may be defined based on partitions (e.g., regions). In these embodiments, a replacement networked device 40 detected within a same partition as an original networked device 40 may use a same unique address as the original networked device 40.

Figure 7A:
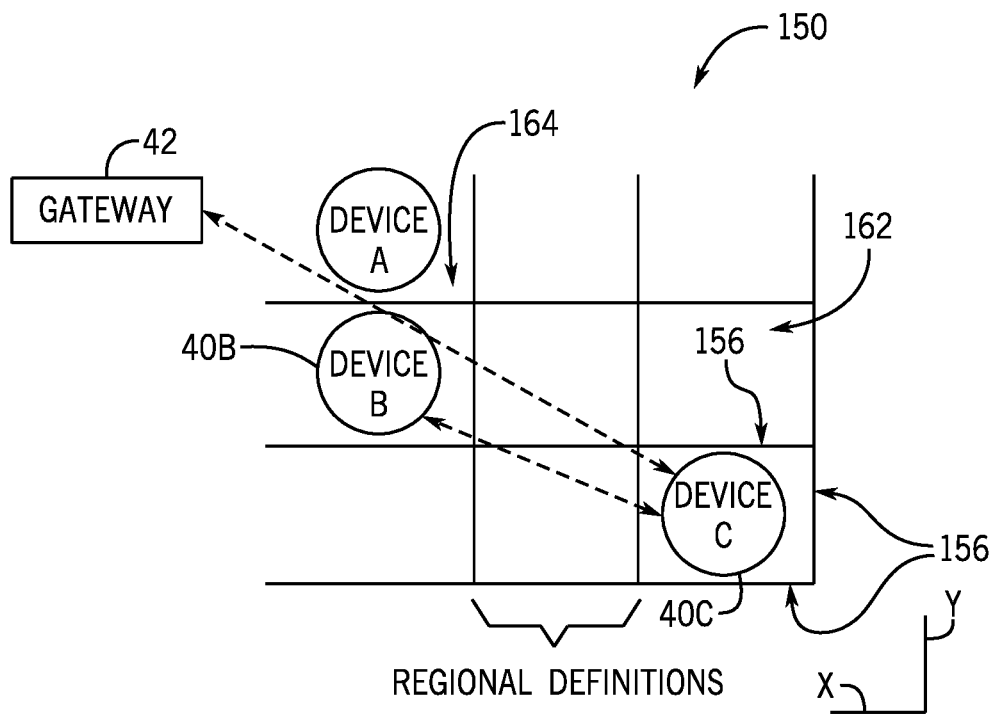
FIG. 7A is a graphical representation of example two-dimensional locating operations that may be performed to determine a location of the networked device of FIG. 2, in accordance with an embodiment.
Figure 7B:
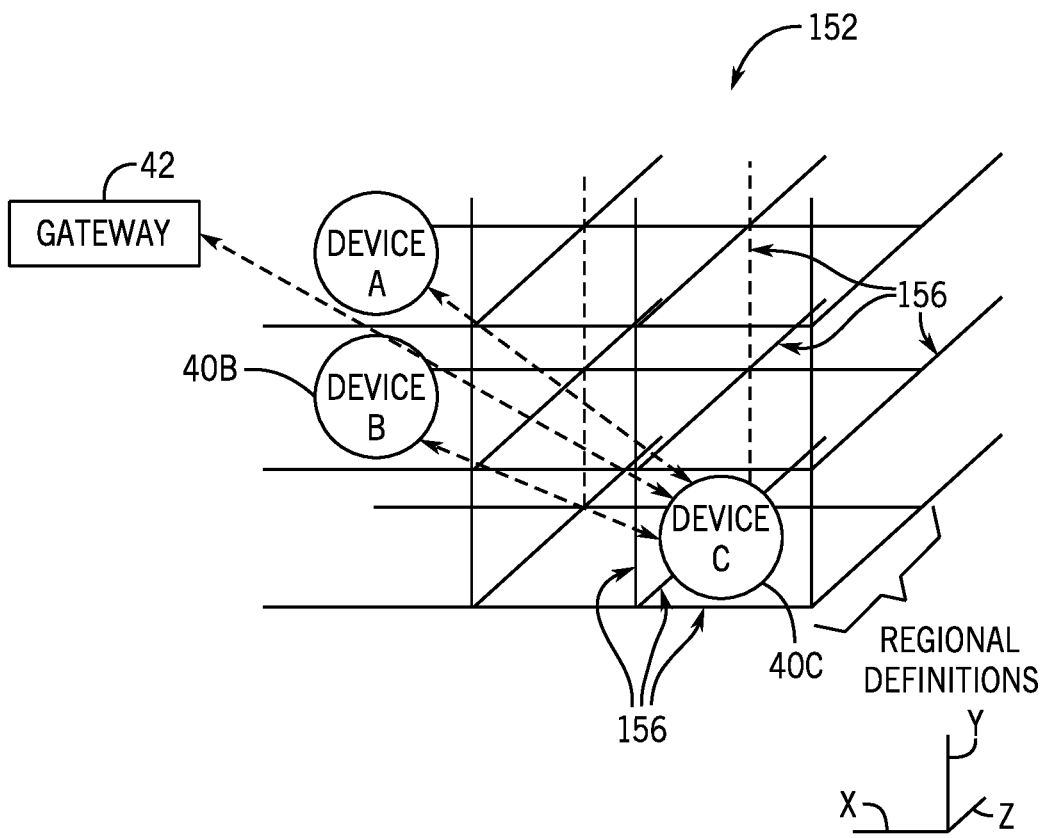
FIG. 7B is a graphical representation of example three-dimensional locating operations that may be performed to determine a location of the networked device of FIG. 2, in accordance with an embodiment.

To help illustrate, FIG. 7A is a graphical representation 150 of an example 2D locating operation performed to determine the location of the networked device 40. FIG. 7B is a graphical representation 152 of an example three-dimensional locating operation performed to determine the location of the networked device 40. For ease of description, FIG. 7A is described with FIG. 7B below.

In the graphical representation 150, the networked device 40C determines its location based on its relative location to the gateway 42 and the networked device 40B. The networked device 40C may determine its location based at least in part on a distance between the networked device 40C and the gateway 42.

This determination may involve an analysis of circular-planes, where a distance between the networked device 40C and the gateway 42 and/or the networked device 40B is used as a radius of respective circles, and where the circular-planes intersect (e.g., for use with two reference radii) correspond to the location of the networked device 40C. This example where the networked device 40C uses positioning relative to two components of the industrial automation system 10 may enable the networked device 40C to determine its location within a plane (e.g., X-Y plane).

The networked device 40C may determine its location within a volume (e.g., X-Y-Z volume) when the networked device 40C determines its location relative to three components of the industrial automation system 10. This is illustrated in FIG. 7B. In the graphical representation 152, the networked device 40C determines its location based on respective distances between the gateway 42, the networked device 40B, and the networked device 40A. The networked device 40C may determine its location using similar determination methods as described relative to FIG. 7A but based on spherical-volume (e.g., determined by three reference radii) intersection rather than circular-planes (e.g., determined by two reference radii) intersection. The networked device 40C may determine its location within a volume based on its positioning relative to three components of the industrial automation system.

In both of these depicted examples, the location of the networked device 40C is self-generated. However, it should be understood that the above-described relative positioning techniques may also be used by the industrial control system 11 to determine the location of the networked device 40C. In general, when the location is within (or between) boundaries 156, any location within the boundaries 156 may correspond to a same unique address. Thus, the boundaries 156 may permit unique addresses to be defined with consideration for assignment tolerances. For example, a replacement device installed in a generally same location and within suitable boundaries 156 may be assigned a same unique address as an original networked device 40 initially installed within the same boundaries 156 despite not being in an exactly same location.

In some embodiments, regions or areas of the industrial automation system 10 (e.g., specific operational units) may demand relatively stricter location assignments than other regions or areas. Thus, it may be of particular use to have boundaries 156 that are of variable sizes. In this way, a first region 162 may be larger and/or have a tighter granularity than a second region 164. For example, a sensor disposed in a relatively open space of the industrial automation system 10 may correspond to a relatively larger definition of a region than a sensor disposed in a relatively small space internal to a cabinet of the industrial automation system. This may be permitted since precision and/or accuracy of location may be relatively more key in some partitions of the industrial automation system 10 in determining which sensor belongs to a particular unique address compared to other partitions.

Figure 8:
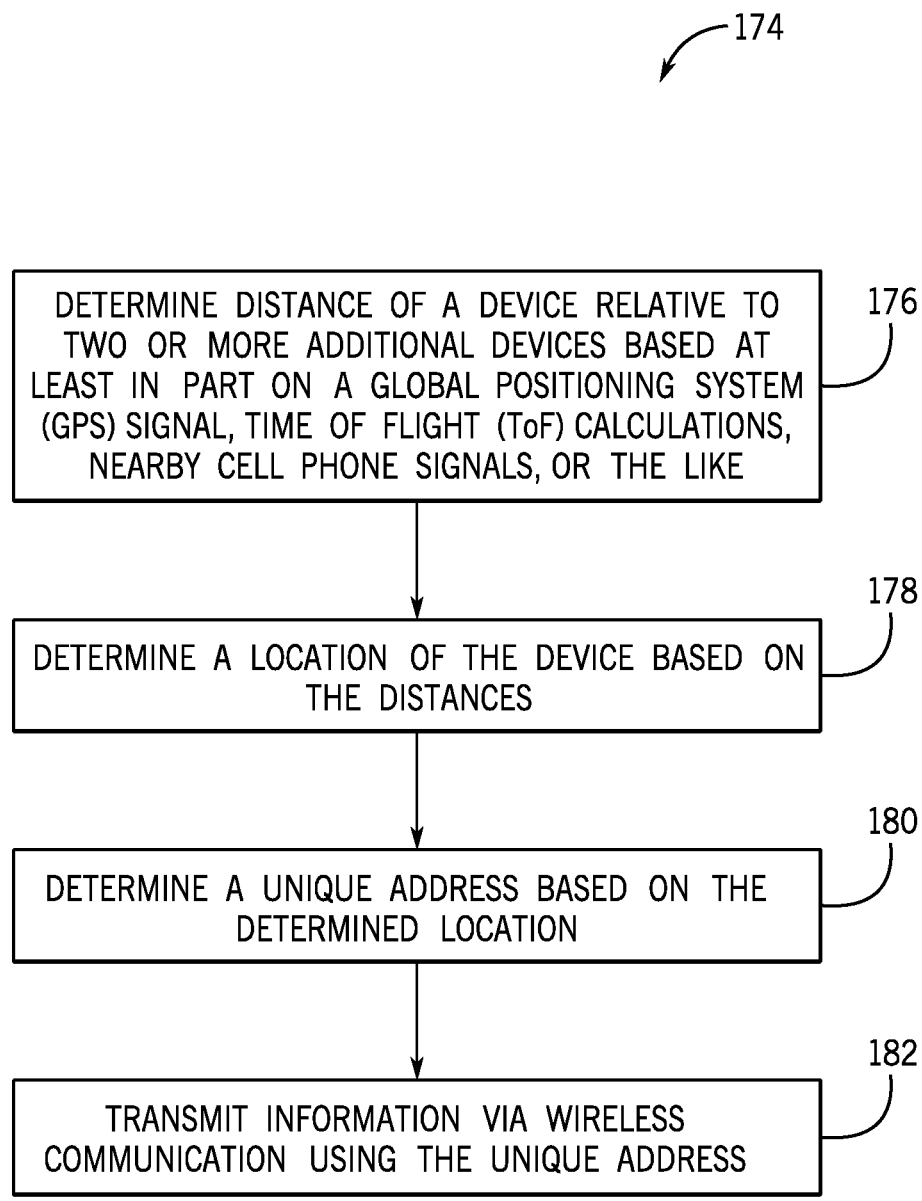
FIG. 8 is a flowchart of a method for determining a unique address based on information gathered at least in part by the device of FIG. 2, in accordance with an embodiment.

To generalize the descriptions above, FIG. 8 is a flowchart of a method 174 for determining a unique address based on information gathered at least in part by the networked device 40. Although the method 174 is described below as being performed by the networked device 40, it should be understood that any suitable processing device, such as the industrial control system 11 (e.g., via the gateway, via the server and/or network device), may perform the method 174. Moreover, although the following description of the method 174 is described in a particular order, it should be understood that the method 174 may be performed in any suitable order.

At block 176, the networked device 40 may determine a distance between itself and two or more additional networked devices 40. The networked device 40 may determine its relative positioning based on a GPS signal, ToF calculation, nearby cell phone signals, or the like. At block 178, the networked device 40 may determine its location based at least in part on the distances determined at the block 176. At block 180, the networked device 40 may determine a unique address for itself based on the determined location from the block 178. Finally, at block 182, the networked device 40 may use the unique address to transmit information to one or more additional components of the wireless network. In this way, the networked device 40 may transmit a first set of signals to a second network component, receive a response from the second network component, and determine the location based at least in part on the response. The networked device 40 may continue onto generate the unique address based on the location and use the unique address when communicating with other networked devices 40 and/or the industrial control system 11. It is noted that these operations may be similarly used by replacement networked devices 40 after being powered-on post-replacement. It is also noted that the networked device 40 and/or the industrial control system 11 may determine channel configurations at any suitable time during the performance of the method 174, such as while determining the unique address at the block 180 and/or before (or while) transmitting information at the block 182.

For example, the channel configurations may be determined each time a location of a networked device 40 is determined. However, in some embodiments, a previously determined channel configuration is saved and associated with the location of a networked device 40 and/or the corresponding unique address. In this way, a default or initialization channel configuration and/or a default address may be used to parallelize determination operations to permit the unique address and the channel configuration to be determined at least partially simultaneous. For example, the initialization channel used for initialization of new networked devices 40 may be used before a final channel is determined for the networked device 40 to use to communicate. As another example, a default address may be used during initialization of new networked devices 40 before a final unique address is determined for the networked device 40 to use.

The initialization channel may be relatively crowded, provided without a specific directionality (e.g., a general beam-forming pattern applicable to many different directions of wireless signal propagation and reception), noisy, or the like. The initialization channel may be a default channel used to determine the location of the networked device 40 for use in determining the unique address. The initialization channel may be used before specific channel configurations are retrieved from memory.

After determining the location, the networked device 40 and/or the gateway 42 may determine a more-desired channel configuration for the networked device 40 to communicate via the network that is different from the initialization channel. For example, the more-desired channel configuration may reference channel configurations stored in memory and associated with the location to determine a less noisy channel, a more directional channel relatively more suited for the location of the networked device 40, and/or a less crowded channel suitable for use with communications of the networked device 40. This may be facilitated by mutual knowledge of the unique address determined by the networked device via the method 90 and by the gateway 42 (e.g., the industrial control system 11) via the method 110.

By using the systems and methods described herein, wireless communication technology may be implemented complimentary to wired communication technology, and be of use for devices that involve rotating, movable, and/or otherwise difficult-to-access areas of the industrial automation system. However, in industrial automation systems, device addressing used by wireless communication technology may be tied together with networked device hardware (e.g., unique device identifiers, EUIDs). After replacing a device in a system that uses unique address generation based on the networked device hardware, the unique address may be updated in response to the device replacement. However, this may be an inefficient process that may introduce errors into industrial automation system operation.

Thus, technical effects of the present disclosure include techniques for operating an industrial automation system based at least in part on a unique address corresponding to a location of a device. In this way, a networked device may perform sensing operations, or otherwise generate information, to be transmitted to an industrial control system. Based on its location within the industrial automation system, a unique address may be determined for the networked device to use when communicating with the industrial control system. When the networked device (e.g., original networked device) is replaced by another networked device (e.g., replacement networked device), the replacement networked device may use a same unique address as the original networked device for wireless communication. Not having to update references to the unique address after a device replacement may increase a robustness of the industrial automation system by improving an efficiency of replacements and/or by improving security.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A device, comprising:
   a first network component configured to communicate with a second network component of an industrial control system; and
   a processor configured to:
   transmit a first set of signals from the first network component to the second network component;
   receive a response from the second network component;
   determine a set of coordinates associated with a location of the device based at least in part on the response from the second network component, wherein the location corresponds to a position of the device in an environment relative to an additional location of the second network component;
   apply a mapping function to the set of coordinates to generate a code representative of the location;
   self-generate a network address by appending the code to a network prefix comprising a global routing prefix and a subnet identification; and
   determine one or more channel configurations for the first network component based on the network address.

2. The device of claim 1, wherein the processor is configured to determine the location based at least in part on a first distance between the first network component and the second network component and based at least in part on a second distance between the first network component and a fourth network component configured to operate as a beacon device.

3. The device of claim 2, wherein the first distance is determined based at least in part on a time of flight calculation.

4. The device of claim 1, wherein the mapping function is configured to incorporate the set of coordinates to a data string to generate the code.

5. The device of claim 1, wherein the processor is configured to determine the location based at least in part on communication with a global positioning system (GPS).

6. The device of claim 1, wherein the location is determined based at least in part on the position of the device being between at least two boundaries of a region corresponding to the industrial control system.

7. The device of claim 1, wherein the one or more channel configurations correspond to a respective industrial unit or a spatial region within the environment, and wherein the processor is configured to:
   apply the one or more channel configurations to the first network component; and
   transmit a data packet to the second network component using the network address and the one or more channel configurations.

8. The device of claim 7, wherein the one or more channel configurations comprise:
   a communication channel having a frequency range, and wherein the processor is configured to transmit the data packet from the first network component to the second network component within the frequency range;
   a transmitter power level at which the processor is configured to operate the first network component; or
   any combination thereof.

9. The device of claim 1, wherein the processor is configured to
   determine that the first network component is replaced by a third network component at a same location; and
   use the network address when transmitting data via the third network component in response to determining that the first network component is replaced by the third network component at the same location.

10. A system, comprising:
    a first device comprising a first network component, wherein the first device is configured to:
    determine a distance between the first device and a position of an additional device in an environment;
    generate a set of coordinates based on the distance and the position, wherein the set of coordinates is indicative of a first location of the first device relative to the position;
    self-generate a network address to be assigned to the first device at least in part by:
    applying a mapping function to the set of coordinates to generate a code representative of the first location of the first device relative to the position, wherein the network address comprises the code; and
    appending the code to a network prefix comprising a global routing prefix and a subnet identification; and
    determine one or more channel configurations for the first network component based on the network address; and a second device comprising a second network component, wherein the second network component is configured to send a data packet to the first network component using the network address and the one or more channel configurations.

11. The system of claim 10, comprising a control system communicatively coupled to the first device and the second device via a wireless network, wherein the control system is configured to:
   determine a second location of the second device relative to the position; and
   generate an additional network address for the second device using the second location of the second device.

12. The system of claim 10, wherein the first device is configured to:
   transmit a first set of signals from the first network component to the second network component;
   receive a response from the second network component;
   determine the first location based at least in part on the response; and
   generate the network address using the first location.

13. The system of claim 10, wherein the first device is configured to determine the first location based at least in part on a first distance and a second distance, wherein the first distance is between the first network component and the second network component, and wherein the second distance is between the first network component and the position.

14. The system of claim 10, wherein the first location is disposed within one or more logical partitions of an industrial automation system comprising the first device and the second device, and wherein the one or more logical partitions are defined over particular ranges of two or more axes.

15. The system of claim 10, wherein the network address comprises a 64-bit string.

16. A tangible, non-transitory computer-readable medium configured to store instructions executable by a processor of a device that, when executed by the processor, cause the processor to:
   transmit a first set of signals from a first network component to a second network component;
   receive a response from the second network component at the first network component;
   determine a set of coordinates associated with a location of the first network component based at least in part on the response from the second network component to the first set of signals;
   apply a mapping function to the set of coordinates to generate a code representative of the location;
   append the code to a network prefix comprising a global routing prefix and a subnet identification to self-generate a network address; and
   determine one or more channel configurations for the first network component based on the network address.

17. The non-transitory computer-readable medium of claim 16, wherein the instructions for generating the network address using the location comprise additional instructions that, when executed by the processor, cause the processor to:
   determine that the code corresponds to a permitted code; and
   generate the network address based at least in part on the code in response to the code corresponding to the permitted code.

18. The non-transitory computer-readable medium of claim 16, wherein the code is generated via reference to a private key.

19. The non-transitory computer-readable medium of claim 18, wherein the code comprises a pseudo random number.

* * * * *